Dec. 23, 1969   N. J. LIPSTEIN   3,486,055
COMMUTATOR AND BRUSH COOLING APPARATUS
Filed Jan. 26, 1968
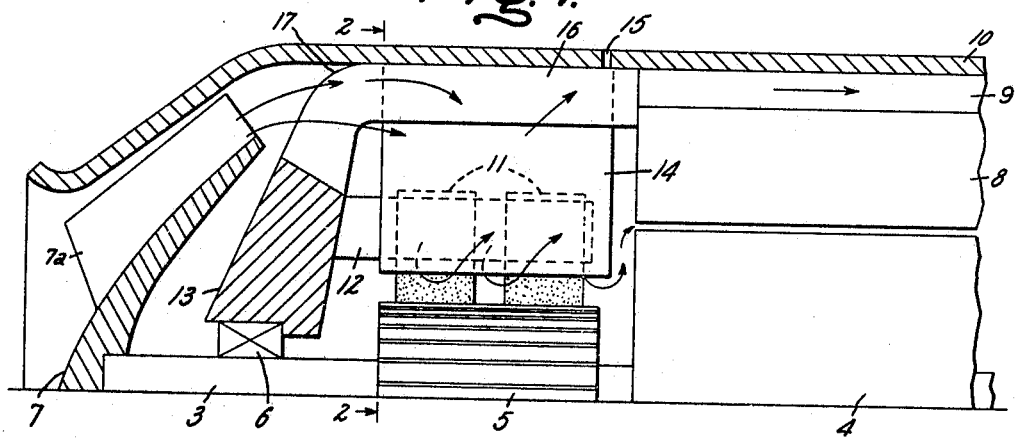
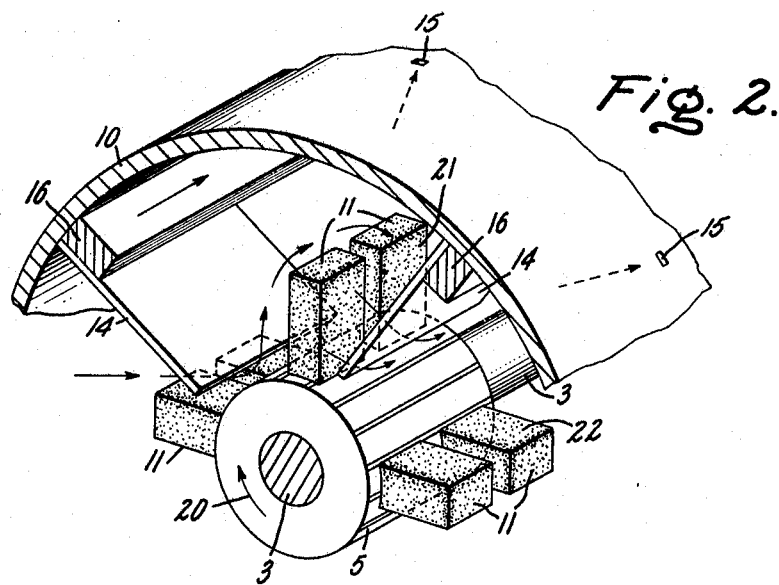
Inventor:
Norman J. Lipstein,
by Louis A. Moucha

United States Patent Office 3,486,055
Patented Dec. 23, 1969

3,486,055
COMMUTATOR AND BRUSH COOLING APPARATUS
Norman J. Lipstein, Schenectady, N.Y., assignor to General Electric Company, a corporation of New York
Filed Jan. 26, 1968, Ser. No. 700,966
Int. Cl. H02k 9/28
U.S. Cl. 310—227          16 Claims

ABSTRACT OF THE DISCLOSURE

Apparatus for cooling the commutator and brush region of electrical machines includes deflecting members positioned between adjacent brushes and spaced from the commutator for deflecting a swirling flow of cool air along the brush and commutator surfaces. The swirling flow of cool air is obtained from a fan attached to a shaft end of the machine. Small apertures located in the casing of the motor intermediate adjacent brushes provide a means for exhausting a portion of the hottest swirling air heated by the brush and commutator surfaces to aid in reducing the temperatures thereof.

---

My invention relates to apparatus for cooling the commutator and brush region of electrical machines, and in particular, to a means for deflecting a relatively high velocity swirling flow of cool air along the brush and commutator surfaces and exhausting a portion of the heated air.

The cooling of motor and generator commutators and brushes is a recurring and increasingly troublesome problem. Modern, compact motor and generator design results in increased current density in the brushes of direct current machines such that brush cooling, as well as commutator cooling, is often the most critical thermal problem, often representing the limiting area in meeting overload and heat run requirements. Stated temperature rise limitations for specific overloads and heat runs are generally provided for each particular machine design.

Conventional cooling of the brush and commutator region of direct current machines, as well as the slip-ring assembly of synchronous alternating current machines, relies on air circulation induced by the rotating element, such as the commutator, to obtain self-ventilation. This self-ventilation, however, ordinarily induces local recirculation of the heated air which is retained along the commutator surface and brush surfaces thereby preventing effective cooling. Another conventional means for cooling the brush-commutator region of electrical machines is the use of a fan mounted on the end of the machine shaft adjacent the commutator-brush assembly to direct a flow of cooling air coaxially with the commutator. The difficulty with the use of the fan is that the flow of cool air is not forced inwardly into contact with the commutator and brush surfaces but rather passes along the inner surface of the casing enclosing the electrical machine. As a result, the cooling air does not come into effective contact with the heated surfaces of the commutator and brushes and thus is relatively ineffectual in obtaining the desired cooling. Further, any contact of the cooling air with surfaces other than the heated surfaces of the commutator-brushes region causes a useless heating of the cooling air which is highly undesirable since the air thence passes axially between the rotor and stator to the other end of the machine shaft thereby providing inefficient cooling of the rotor-stator region of the machine.

Therefore, one of the principal objects of my invention is to provide an improved means for efficiently cooling the commutator-brush region of electrical machines.

Another object of my invention is to exhaust a portion of the hottest air heated by the brush and commutator surfaces to thereby reduce the temperatures thereof and also reduce the temperature of such cooling air which continues axially between the machine rotor and stator for more efficient cooling thereof.

Briefly stated, my invention comprises apparatus for cooling the commutator and brush region, or slip-ring region, of electrical machines. It includes a means for deflecting a swirling flow of cool air along the commutator and brush surfaces. A swirling flow of cool air is discharged by a fan attached to a first end of the machine shaft and such swirl of air is directed along the outer perimeter of the brush assembly in the direction of machine rotation. A plurality of deflecting members act as baffles between adjacent brushes for deflecting the swirling flow of cool air at a relatively high velocity along a first surface of each brush to the commutator surface, along the commutator surface, and then away from the commutator along a second surface of an adjacent brush. Small apertures may be provided in the machine casing which encloses the fan, commutator-brush assembly and rotor-stator assembly, each aperture positioned intermediate a deflecting member and the adjacent brush second surface for exhausting a portion of the hottest swirling air heated by the brush and commutator surfaces to thereby reduce the temperatures thereof. The remaining heated swirling air provides cooling of the rotor and stator assembly.

The features of my invention which I desire to protect herein are pointed out with particularity in the appended claims. The invention, itself, however, both as to its organization and method of operation, together with further objects and advantages thereof, may best be understood by reference to the following description taken in connection with the accompanying drawing wherein like parts in each of the figures are identified by the same reference character, and wherein:

FIGURE 1 is a side view, partly in section, of the upper half of an electrical machine employing the cooling apparatus in accordance with my invention; and FIGURE 2 is a perspective view, partly in section, taken along line 2—2 in FIGURE 1.

Referring now in particular to FIGURE 1, there is shown a portion of the upper half of an electrical machine including the details of the cooling apparatus in accordance with my invention. The machine includes a rotatable shaft 3 on which is suitably mounted a rotor 4, commutator 5, bearing 6 and a fan 7. It is to be noted that fan 7 is mounted on a first end of shaft 3, rotor 4 is mounted near the second end of such shaft and commutator 5 is mounted intermediate the fan and rotor. The use of the commutator indicates that the machine in FIGURE 1 is of the direct current type, either motor or generator, but it should be understood that my invention is equally applicable to synchronous alternating current machines utilizing slip-ring assemblies which are also subject to heating. A stator 8, spaced radially from rotor 4, is mounted in surrounding relationship therewith. Stator 8 is mounted on a suitable frame member 9 connected to a casing or outer shell member 10 which encloses the stator, commutator and fan. Casing 10 is coaxial with shaft 3 and extends the length of the electrical machine for enclosing it along the full length of the shaft for purposes to be described hereinafter. A plurality of brushes 11 are supported in fixed position relationship with respect to commutator 5 to provide the necessary sliding contact therewith. In the particular embodiment illustrated in FIGURES 1 and 2, a pair of brushes are supported by each member 12 of a brushholder, it being understood that any number of one or more brushes axial with the commutator may be utilized in my invention. The plurality of brushes are spaced peripherally around the commutator, the FIGURE 2 illustration indicating brush spacings of 90°, it being understood that any number of pairs of brushes may be utilized as is conventional in the direct current electrical machine art. The brushholder 12 is not illustrated in FIGURE 2 since it is of conventional design. Brushholder 12 is firmly fixed in position by suitable connection to a solid disc-shaped member 13 supported from bearing 6.

The elements hereinabove described comprise a conventional direct current electrical machine wherein fan 7 directs a flow of cool air coaxially with the commutator from the fan-end of shaft 3 toward the rotor end. As stated before, the disadvantage with this type of cooling is that the flow of air is along the inner surface of casing 10 with only a minimum amount of the cooling air coming into effective contact with the heated surfaces of the commutator and brushes to thereby provide very ineffectual cooling thereof.

My invention provides a means for deflecting the flow of cool air discharged by fan 7 to obtain direct contact thereof with the heated surfaces of the brushes and commutator. This deflection of the cool air obtains a maximum temperature differential between the coolant (cool air) and heated surfaces to thereby provide the most effective cooling thereof. My invention also provides a means for exhausting a portion of the hottest air which has been heated by the commutator and brush surfaces to aid in the cooling of such surfaces and also to permit the remainder of the air which passes axially between the rotor and stator and between the stator and frame to be of a lower temperature and thereby also provide a more efficient cooling of such regions of the machine.

The cool air discharged by fan 7 is a swirling flow of air directed along the inner surface of casing 10 in the region immediately adjacent its discharge from the fan blades 7a as illustrated by the flow pattern lines with arrowheads indicating the flow direction in FIGURE 1. It should be remembered that this flow pattern (and the deflected flow to be described) continues circumferentially about shaft 3 as the longitudinal axis. The swirling flow of cool air upon approaching the brush assembly region, continues both axially of shaft 3 and in the direction of machine rotation wherein the direction of shaft rotation is indicated by arrow 20 in FIGURE 2. A means for deflecting the swirling flow of cool air toward the commutator comprises a plurality of equally spaced deflecting members, each deflecting member 14 being spaced between adjacent peripherally disposed brushes 11 and disposed axially with the commutator as illustrated more clearly in FIGURE 2. The deflecting members 14 may have any of a number of shapes, a particular shape which has been found very useful is that of a planar surface directed substantially radially inward toward the longitudinal axis of shaft 3. Deflecting members 14 are each positioned in close proximity to the first surface 21 of a pair of brushes and at a greater distance from the second surface 22 of the adjacent pair of brushes. The deflecting members may be positioned parallel to, or in converging relationship to first surface 21 of the brushes. The ratio of minimum spacings between a deflecting member and the brush second and first surfaces above-described (i.e. at the radially inward edge of the deflecting member) is preferably in the range of 2:1 to 5:1, but may conceivably be any ratio greater than 1:1. Deflecting members 14 are spaced from the commutator surface such that the radial spacing between commutator surface and the near edge of the deflecting members is in the range of $\frac{1}{20}$ to $\frac{1}{2}$ of the radial spacing between the commutator surface and inner surface of casing 10. The width (axial) dimension of each deflecting member is somewhat less than the axial dimension of the commutator.

Deflecting members 14 are supported radially outward from the commutator 5 in fixed position relative to the brushes by means of a plurality of arm members 16 which extend from solid disc-shaped base member 13 in a direction both radially outward and axially of shaft 3. Each arm member 16 supports a deflecting member 14 which is connected thereto in any suitable manner. The radially outermost portions of arm members 16 are connected to casing 10 in any suitable manner to provide the firm support for the deflecting members. The openings defined by the web portions 17 of arm members 16 provide communication between fan 7 and the inflow chutes for the flow of cool air. It is appreciated that other means for supporting deflecting members 14 may also be utilized and my invention is not construed to be limited to the particular support means herein described.

The above-recited orientation of the deflecting members, as clearly shown in FIGURE 2, converts the tangential component of cooling air to a radial inflow which is directed through inflow chutes having side walls defined by the first surfaces 21 of the brushes and the near sides of the deflecting members 14. A very small portion of the total air discharged by fan 7 continues along the inner periphery of casing 10 and is not deflected through the inflow chutes. The decreasing spacing of the surface 21 from member 14 with decreasing radial distance from the commutator increases the velocity of the swirling flow of cool air in its passage therebetween toward the commutator surface in a direction both radially inward and axial of shaft 3 as indicated by the flow pattern lines in FIGURES 1 and 2. The rotation of commutator 5 further aids in pumping the flow of cool air between the baffle bottom and commutator surface. Thus, a major portion of the air flows in a somewhat helical path, that is, flows both axially and radially of the commutator surface. As illustrated by the flow pattern lines in FIGURES 1 and 2, cool air external of the machine flows through fan 7 and then in a direction both axially and radially inward of the commutator through the inflow chutes (for cooling the brush surfaces 21), along the commutator surface in the region between such surface and the near end of the deflecting members (for cooling the commutator surface), and finally in a direction both axially and radially outward of the commutator through outflow chutes defined by the second surfaces 22 of the adjacent brushes and the near sides of the deflecting members (for cooling the brush surfaces 22). The heated air flowing through the outflow chutes is distributed into the rotor-stator spacing and continues axially therealong for cooling such region, through the open frame 9 between stator 8 and casing 10 and flowing axially therealong for cooling the stator and finally a portion of the hottest swirling air is exhausted through apertures 15 in casing 10, if such apertures are used.

The plurality of apertures 15 is of number at least equal to the plurality of deflecting members 14, the apertures being equally spaced in a circular arrangement around shaft 3 and located between the second surfaces 22 of the brushes and deflecting member 14 to thereby exhaust a portion of the hottest swirling air directed outwardly through the outflow chutes. Due to the axial component in the air flow in the brush-commutator assembly, the hottest air flowing in the outflow chutes is directed toward casing 10 at the rotor-stator end of commutator 5. For this reason, apertures 15 are preferably located in casing 10 approximately at such end of commutator 5. The particular length of commutator 5, sizes of brushes 11, radial distance between commutator surface and casing 10, and rotational speed of shaft 3 primarily determine the exact axial location of apertures 15 in order to accept a portion of the hottest swirling air that has been heated by the commutator and brush surfaces. The aperture size is determined by the amount of air required to cool the stator, rotor and drive-end bearing (not shown) and the system air resistance which will best match the fan pressure-flow capabilities. The apertures may have any of a number of shapes such as rectangular, square, or circular, and may be omitted, if desired, depending on the just stated factors.

As a particular example of my invention, the brushes of an aircraft direct-current generator having the following characteristics attained a temperature of 280–285 degrees centigrade during a three minute, 150% overload run at a shaft speed of 10,886 revolutions per minute (r.p.m.) prior to the use of my invention. Upon application of my invention, the brush temperatures were reduced to 250 degrees C. The commutator surface temperature and the drive end bearing and armature winding (rotor) temperatures were also significantly reduced thereby indicating that the coolant flow beyond the brush and commutator assembly has also been significantly increased. The generator was rated at 9 kilowatts, speed 7470–12000 r.p.m. over all length of approximately 11 inches and outside diameter of 5½ inches, commutator length along the brushes of 2⅜ inches and diameter of 2⅛ inches. A four bladed fan in combination with the commutator produced an air flow of 70 cubic feet per minute. Each deflecting member was ⅞ inch long (radially) and 1¾ inch wide (axially) and provided a ¼ inch spacing between the commutator outer surface and near end of the deflecting member. Each aperture was 1 inch long (circumferentially) and 0.30 inch wide (axially).

From the foregoing description, it can be appreciated that my invention obtains the objectives set forth in that it makes available a deflector-exhaust apparatus for efficiently cooling the commutator-brush region, or the slip-ring region of electrical machines. Having described my apparatus, it is believed obvious that modification and variation of my invention is possible in light of the above teachings. Thus, the deflecting members may be of shape other than planar and may be spaced between adjacent brushes at any number of spacings therefrom, the particular spacing for obtaining the most efficient cooling being determined by the electrical machine dimensions and operating characteristics. Further, the size, shape and number of hot air discharge apertures in the machine casing, if utilized, may be varied as determined by the electrical machine dimensions and operating characteristics. Finally, a radial baffle may be added, or the deflecting members 14 so formed that the apertures are either shielded from all flow except that derived from the outflow chute, or that the total air-flow is directed through the inlet and outlet chutes. It is, therefore to be understood that changes may be made in the particular embodiment as described which are within the full intended scope of the invention as defined by the following claims.

What I claim as new and desire to secure by Letters Patent of the United States is:

1. Apparatus for cooling the commutator and brush region of electrical machines comprising:
   means for discharging a swirling flow of cool air along the outer perimeter of the brush assembly of an electrical machine wherein the swirl is in the direction of machine rotation, and
   planar means for deflecting the swirling flow of cool air in paths along first surfaces of the brushes to the commutator surface between adjacent brushes at a relatively high velocity and then along second surfaces of the adjacent brushes.

2. The commutator and brush cooling apparatus set forth in claim 1 wherein:
   said deflecting means comprises deflecting members positioned between adjacent brushes.

3. The commutator and brush cooling apparatus set forth in claim 2 wherein:
   said deflecting members are each positioned in close proximity to the first surface of the brushes and at a greater distance from the second surface of the adjacent brushes whereby the close spacing of the deflecting member-first brush surface increases the velocity of the swirling flow of cool air in its passage therebetween toward the commutator surface.

4. The commutator and brush cooling apparatus set forth in claim 2 wherein:
   said deflecting members are disposed axially along the commutator axis.

5. The commutator and brush cooling assembly set forth in claim 4 wherein:
   said deflecting members are supported radially outward from the commutator and spaced therefrom for passage of the cool air along the commutator surface, the nonsupported end of said deflecting members projecting between adjacent brushes and being of planar shape.

6. The commutator and brush cooling apparatus set forth in claim 2 and further comprising:
   means for supporting said deflecting members in fixed position relative to the brushes, and
   means for exhausting a portion of the hot air heated by the brush and commutator surfaces to further aid in reducing the temperatures thereof, said supporting means providing communication between said cool air discharging means and said deflecting members.

7. The commutator and brush cooling apparatus set forth in claim 6 wherein:
   said hot air exhausting means comprise a plurality of apertures in the electrical machine casing to which said deflecting member supporting means is connected, an aperture positioned between each deflecting member and associated second surface of the adjacent brush to accept a portion of the heated swirling air passing away from the commutator between said deflecting member and second surface of the adjacent brush.

8. The commutator and brush cooling apparatus set forth in claim 6 wherein:
   said hot air exhausting means comprise a plurality of small apertures in the electrical machine casing to which said deflecting member supporting means is connected.

9. The commutator and brush cooling apparatus set forth in claim 3 wherein:
   the ratio of the minimum spacing between each deflecting member and adjacent brush second surface to the spacing between the deflecting member and brush first surface is in the range of 2:1 to 5:1.

10. The commutator and brush cooling apparatus set forth in claim 3 wherein:
    the ratio of the minimum spacing between each deflecting member and adjacent brush second surface to the spacing between the deflecting member and brush first surface is greater than 1:1.

11. The commutator and brush cooling apparatus set forth in claim 7 wherein:
    the apertures are equally spaced in a circular arrangement around the commutator and adjacent the end thereof removed from said cool air discharging means, the apertures being of number equal to the number of deflecting members.

12. The commutator and brush cooling apparatus set forth in claim 6 wherein:
    said deflecting member supporting means comprises:
    a solid disk shaped base member supported from the shaft on which the commutator is mounted, and
    a plurality of arm members extending from said base member, each arm member providing support for an associated deflecting member connected thereto.

13. The commutator and brush cooling assembly set forth in claim 12 wherein:
    said base member is displaced axially from the commutator, said base member positioned intermediate said cool air discharging means and the commutator, and
    said arm members each extending from said base member in a direction both radially outward from and axially with the shaft, the radially outer portions of said arm members connected to the electrical machine casing.

14. A direct current electrical machine comprising:
a rotatable shaft,
a fan mounted on a first end of said shaft,
a rotor mounted near a second end of said shaft,
a commutator mounted on said shaft intermediate said fan and rotor,
a stator spaced radially from said rotor and mounted in surrounding relationship therewith,
a plurality of brushes in communication with said commutator and spaced peripherally therewith,
an outer shell member enclosing said fan, brushes and stator,
a plurality of deflecting members, each member spaced between adjacent peripheral brushes and spaced from said commutator, said deflecting members supported from a like plurality of arm members extending axially of the commutator and spaced therefrom and connected to the outer shell member, said extending arm members converging to a common solid disc-shaped member supported from a bearing mounted on the rotatable shaft intermediate said fan and commutator, and
a plurality of apertures of number equal to the plurality of deflecting members and located in the outer shell member, the apertures spaced in a circular arrangement around the shaft and in proximity to the deflecting members for exhausting a portion of the hottest swirling air heated by the brush and commutator surfaces to thereby reduce the temperatures thereof.

15. The machine set forth in claim 14 wherein:
said deflecting members are of planar shape and positioned axially along said commutator.

16. The machine set forth in claim 15 wherein the radial spacing between the commutator surface and the near edge of said deflecting members is in the range of $\frac{1}{20}$ to $\frac{1}{2}$ of the radial spacing between the commutator surface and inner surface of said outer shell member.

References Cited

UNITED STATES PATENTS

| 558,120 | 4/1896 | Thomson et al. | 310—227 |
| 1,594,150 | 7/1926 | Burke | 310—227 |
| 1,719,407 | 7/1929 | Trudeau | 310—227 |

FOREIGN PATENTS 895,021  10/1953  Germany.

MILTON O. HIRSHFIELD, Primary Examiner

D. F. DUGGAN, Assistant Examiner